United States Patent [19]

Chiba et al.

[11] Patent Number: 5,557,594
[45] Date of Patent: Sep. 17, 1996

[54] METHOD AND APPARATUS FOR RECORDING DATA ON RECORDING MEDIUM

[75] Inventors: Nobuhiro Chiba; Yasuo Iwasaki, both of Kanagawa, Japan

[73] Assignee: Sony Corporation, Tokyo, Japan

[21] Appl. No.: 360,349

[22] Filed: Dec. 21, 1994

[30] Foreign Application Priority Data

Dec. 21, 1993 [JP] Japan .................................. 5-322158

[51] Int. Cl.⁶ ............................................. G11B 7/013
[52] U.S. Cl. ........................... 369/59; 360/40; 341/58
[58] Field of Search .................... 369/59, 47, 48, 369/49, 124, 60; 360/32, 40, 39, 41; 341/58, 59, 68, 69

[56] References Cited

U.S. PATENT DOCUMENTS

| | | | |
|---|---|---|---|
| 4,501,000 | 2/1985 | Immink et al. . | |
| 4,603,413 | 7/1986 | Sinjou et al. | 369/59 |
| 4,775,985 | 10/1988 | Busby . | |
| 5,151,699 | 9/1992 | Moriyama . | |
| 5,349,349 | 9/1994 | Shimizume | 360/40 X |

FOREIGN PATENT DOCUMENTS

| | | | |
|---|---|---|---|
| 58-83313-A | 5/1983 | Japan | G11B 5/09 |
| 58-165454-A | 9/1983 | Japan | H04L 25/49 |
| 1-27510-B | 5/1989 | Japan | G11B 5/09 |
| 115751-A | 4/1992 | Japan | H04L 25/49 |

OTHER PUBLICATIONS

Patent Abstracts of Japan, vol. 12, No. 162 (E–609), May 17, 1988 and JP–A–62 272 726 (Oki Electric Ind. Co., Ltd.), Nov. 26, 1987.

Patent Abstracts of Japan, vol. 17, No. 681 (P–1660), Dec. 14, 1993 and JP–A–05 225 709 (Hitachi Ltd.), Sep. 3, 1993.

*Primary Examiner*—Georgia Y. Epps
*Assistant Examiner*—P. W. Huber
*Attorney, Agent, or Firm*—Limbach & Limbach L.L.P.

[57] ABSTRACT

To improve the reliability of reproduction by performing signal processing so that substantially (almost) all DC is eliminated when digital data is recorded on a recording medium such as a magneto-optical disk. When data is recorded on a recording medium such as a magneto-optical disk, generally the digital data is modulated and encoded before being recorded, but sometimes the modulation code is not DC free due to a recording channel code of an NRZI system, etc. According to the present invention, data is divided into parts each having a certain constant length so as to prevent the DC component from building up. A resynchronization signal RESYNC is inserted in the break between the parts, the data is preliminarily modulated and encoded subsequent to the RESYNC, the DC component thereof is counted, and the pattern of the RESYNC is changed in the direction so that the phase becomes a minus value when the sum of the DC components DSV (digital sum value) up to before that RESYNC is a plus value and becomes a plus value when the sum is a minus value, that is, the DSV converges to zero, and the changed data is subjected to modulation and encoding, thereby to reduce the DC component of the recording data.

14 Claims, 5 Drawing Sheets

FIG. 3

RECORDING DIRECTION →

| | | | | | | | | | | | | | |
|---|---|---|---|---|---|---|---|---|---|---|---|---|---|
| | SB1 | SB2 | SB3 | D1 | D2 | D3 | D4 | D5 | D6 | D7 | D8 | D9 | D10 |
| | | | | D11 | D12 | D13 | D14 | D15 | D16 | D17 | D18 | D19 | D20 |
| | | | RS1 | D21 | D22 | D23 | D24 | D25 | D26 | D27 | D28 | D29 | D30 |
| | | | | D31 | D32 | D33 | D34 | D35 | D36 | D37 | D38 | D39 | D40 |
| | | | RS2 | D41 | D42 | D43 | D44 | D45 | D46 | D47 | D48 | D49 | D50 |
| | | | RS3 | | | | | | | | | | |
| 104 ROW | ≈ | | | | | | | | | | | | ≈ |
| | | | RS49 | | | | | | | | | | |
| | | | RS50 | | | | | | | | | | |
| | | | | D1011 | D1012 | D1013 | D1014 | D1015 | D1016 | D1017 | D1018 | D1019 | D1020 |
| | | | RS51 | D1021 | D1022 | D1023 | D1024 | P1.1 | P1.2 | P1.3 | P1.4 | P2.1 | P2.2 |
| | | | | P2.3 | P2.4 | P3.1 | P3.2 | P3.3 | P3.4 | C1 | C2 | C3 | C4 |
| | | | RS52 | E1.1 | E2.1 | E3.1 | E4.1 | E5.1 | E6.1 | E7.1 | E8.1 | E9.1 | E10.1 |
| | | | | E1.2 | E2.2 | E3.2 | E4.2 | E5.2 | E6.2 | E7.2 | E8.2 | E9.2 | E10.2 |
| | | | RS53 | E1.3 | E2.3 | E3.3 | E4.3 | E5.3 | E6.3 | E7.3 | E8.3 | E9.3 | E10.3 |
| 15 ROW | ≈ | | | | | | | | | | | | ≈ |
| | | | RS59 | E1.15 | E2.15 | E3.15 | E4.15 | E5.15 | E6.15 | E7.15 | E8.15 | E9.15 | E10.15 |
| | | | | E1.16 | E2.16 | E3.16 | E4.16 | E5.16 | E6.16 | E7.16 | E8.16 | E9.16 | E10.16 |

FIG. 4

```
        A
        ↙
0 0 1 1 1 1 1 1 0 0 0 | 0 0 1 1 1 1 0 0 0 1 1 1 1 1 1 0 0 1 1 1 0 0 0 0 1 1
    RESYNC 1          [-1-1+1+1+1+1+1+1-1-1-1+1+1+1+1-1-1-1+1+1+1-1-1-1-1+1+1 = +4 ← DSV

B
                      ↙
1 1 0 0 0 0 0 0 1 1 1 | 1 1 0 0 0 0 1 1 1 0 0 0 0 0 0 1 1 0 0 0 1 1 1 1 0 0
    RESYNC 2          [+1+1-1-1-1-1+1+1+1-1-1-1-1-1-1+1+1-1-1-1+1+1+1+1-1-1 = -4 ← DSV
```

RESYNC 1 NON-INVERSION PATTERN (DSV CALCULATED PATTERN)
RESYNC 2 INVERTED PATTERN

FIG. 5

| SB1 | SB2 | SB3 | +8 | RS1 | +5 | RS1 | −7 | RS1 | −6 | RS1 | +4 | WHEN DSV CALCULATION |
|-----|-----|-----|----|-----|----|-----|----|-----|----|-----|----|----------------------|

(DSV1)      DSV2 DURING RESYNC

| SB1 | SB2 | SB3 | +8 | RS2 | −5 | RS1 | −7 | RS2 | +6 | RS2 | −4 | AFTER CONVERSION OF RESYNC (OUTPUT SIGNAL) |
|-----|-----|-----|----|-----|----|-----|----|-----|----|-----|----|--------------------------------------------|

SUM OF DSV (DSV1)   +8   +3   −4   +2   −2

METHOD AND APPARATUS FOR RECORDING DATA ON RECORDING MEDIUM

BACKGROUND OF THE INVENTION

The present invention relates to a method and apparatus for recording digital data on an optical disk, magneto-optic disk, or other recording medium.

More specifically, the present invention relates to a method and apparatus for processing digital data so as to enable even recording data not free of DC components, such as NRZI recording channel codes, to be processed to become substantially DC free and be recorded on a recording medium.

When recording data on a magneto-optic disk or other recording medium, in general data is processed to modulate and encode it before recording.

If this modulated and encoded data is recorded as it is on the recording medium, in a case such as an NRZI recording channel code which is not DC free, since the DC component of the recording data changes, the threshold level of the data will change relatively at the time of reproduction and sometimes the data will not be able to be reproduced properly.

SUMMARY OF THE INVENTION

The object of the present invention is to provide a method and apparatus for processing digital data so as to enable even recording data not free of DC components, such as NRZI recording channel codes, to be processed to become substantially DC free and be recorded on a recording medium.

Accordingly, the present invention provides a method for processing digital data comprised of the steps of:

(a) performing predetermined modulation to digital data, (b) computing the DSV for each predetermined unit of the digital data modulated at step (a), (c) selectively adding to each predetermined unit of the predetermined digital data a first synchronization signal or a second synchronization signal comprised of the first synchronization signal with at least a final bit inverted in accordance with the results of the computation at step (b), and (d) performing the same modulation as in step (a) on the digital data based on the first synchronization signal or the second synchronization signal added at step (c).

The concept of the present invention will be explained below.

When the modulated and encoded data is not DC free, the data is divided into constant lengths so that the DC components do not accumulate. The method of division is to insert recording data of a predetermined length between a synchronization signal and a first resynchronization signal for restoring loss of synchronization, between the first resynchronization signal and a second resynchronization signal, and so on between adjoining resynchronization signals. That is, the recording data is divided into predetermined lengths and resynchronization signals are inserted in the breaks of the data for the purpose of restoration of lost synchronization. The pattern of resynchronization signals is changed to eliminate the DC components. Toward this end, after the resynchronization signals, the data is modulated and encoded and the DC components counted in advance. The resynchronization signal RESYNC of a phase where the sum of the DC components of the data up until the next resynchronization signal, that is, the digital sum value (DSV), is made to be − if + and + if − is changed when modulating and encoding the data so as to reduce the DC components of the recording data.

Further, according to the present invention, there is provided an apparatus for working this method. That is, the present invention provides an apparatus for processing digital data provided with:

first modulating means for applying predetermined processing for modulating predetermined digital data, DSV computing means for computing the DSV for every predetermined unit of modulated digital data modulated by the above first modulating means, synchronization signal adding means for selectively adding to each predetermined unit of the predetermined digital data a first synchronization signal or a second synchronization signal comprised of the first synchronization signal with at least a final bit inverted in accordance with the results of the computation of the above DSV computing means, and second modulating means for connecting to the above synchronization signal adding means and for performing the same modulation as the above first modulating means on the above desired digital data based on the above synchronization signal.

Preferably, at the above step (a) and step (b) or at the first modulating means and second modulating means, the modulation is performed on the above digital data by the NRZI system.

More preferably, at the above step (c) or at the above synchronization signal adding means, (a) a signal comprised of the above first synchronization signal with all the bits inverted is added to the above digital data as the above second synchronization signal or (b) a signal comprised of the first synchronization signal with just the final bit inverted is added to the above digital data as the above second synchronization signal.

More preferably, a main synchronization signal is added to each first unit of the above digital data and the above first synchronization signal or the above second synchronization signal is selectively added to the above digital data to each second unit of the above digital data, smaller than the above first unit, in accordance with the results of computation at the above step (b) or the first modulating means.

Specifically, the first and second synchronization signal are inhibit patterns encoded by run length limitation.

More preferably, provision is made of a step or recording means for recording on the recording medium the digital data modulated at the above step (d) or the second modulating means.

BRIEF DESCRIPTION OF THE DRAWINGS

The above objects and features of the present invention will be more apparent from the following description of the preferred embodiments with reference to the accompanying drawings, wherein:

FIG. 3 shows an example of the format of data recorded on the magneto-optic disk of the present invention;

FIG. 4 is a graph showing an example of the count value by a DSV counter of the present invention;

FIG. 5 is a graph showing the relationship between the DSC and the resynchronization signal RESYNC in the present invention.

DESCRIPTION OF THE PREFERRED EMBODIMENTS

Embodiments of the present invention will be described next with reference to the related figures.

Figure 1:
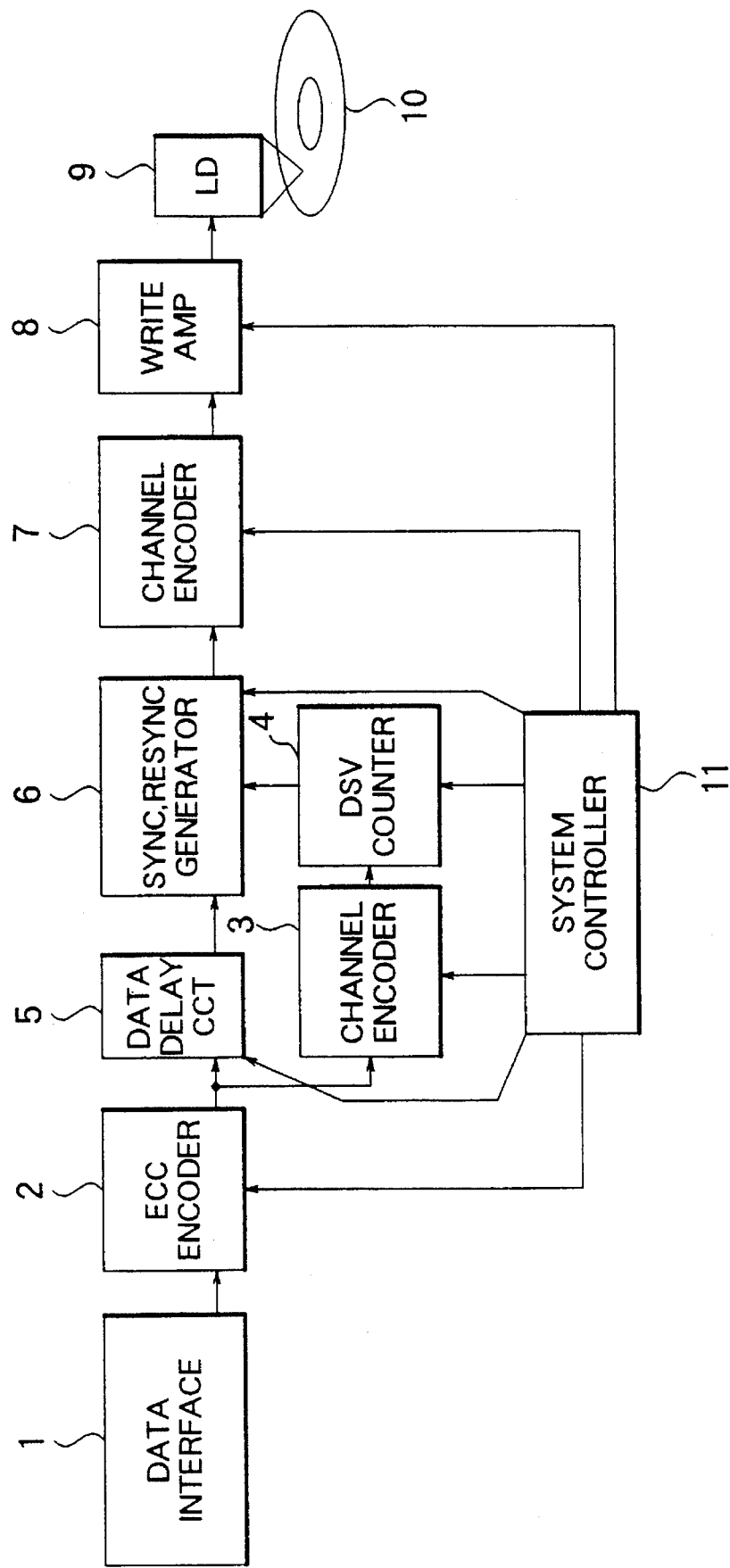
FIG. 1 is a block diagram of a data recording system of a magneto-optic disk apparatus of the present invention.

FIG. 1 is a block diagram of a data recording system of a magneto-optic disk apparatus as an embodiment of the apparatus for recording data on a recording medium of the present invention.

The magneto-optic disk apparatus is provided with an interface circuit 1, an error correction code encoder (computing circuit) 2, a channel encoder (modulation and encoding circuit) 3, a digital sum value (DSV) counter 4, a data delay circuit 5, a synchronization signal (SYNC) and resynchronization signal (RESYNC) signal generator 6, a delayed data channel encoder (modulation and encoding circuit) 7, a write data amplifier 8, a laser diode (LD) 9, and a magneto-optic disk (MO) 10.

The operation of these circuits will be explained below.

Figure 2:
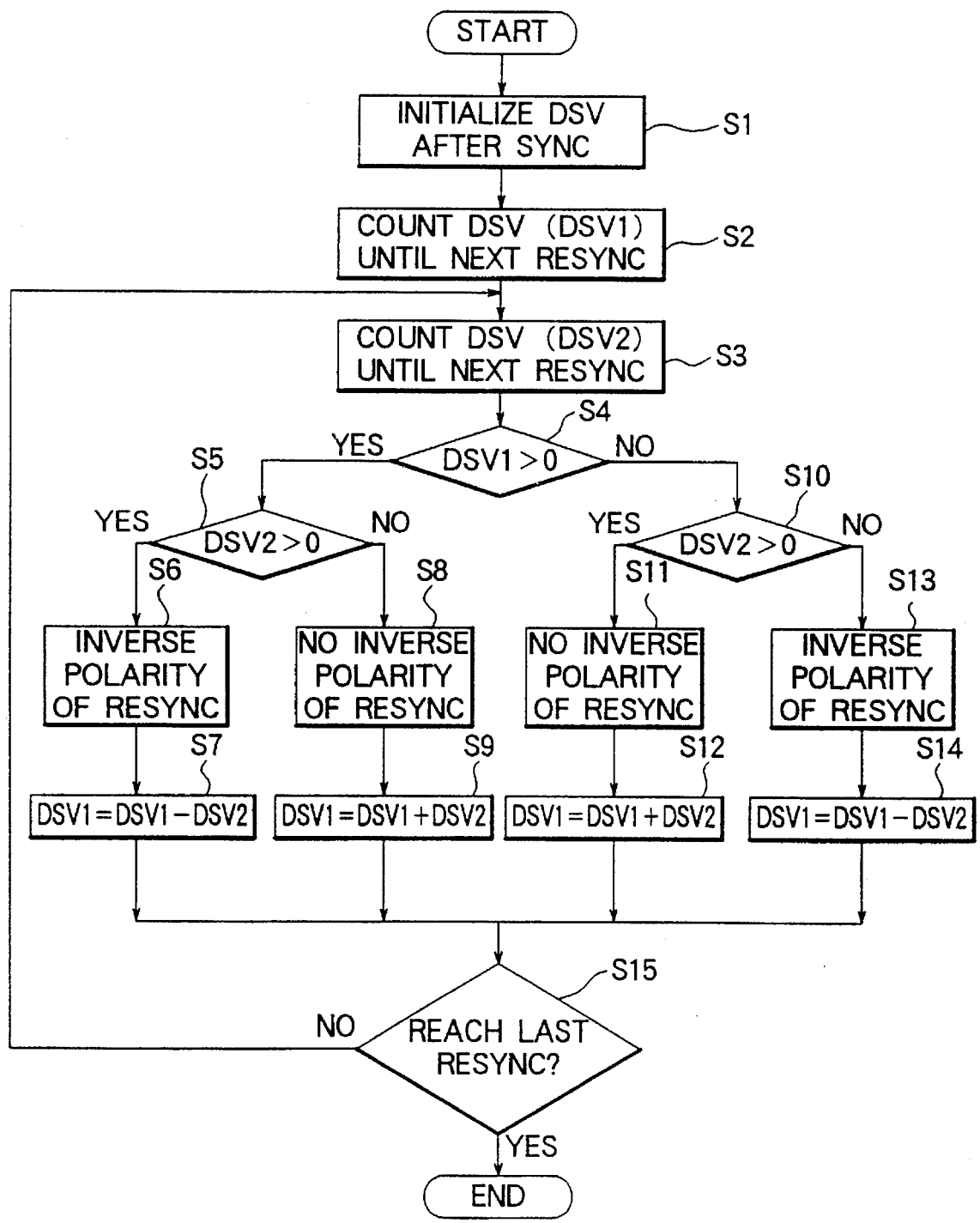
FIG. 2 is a flow chart showing the processing of a DSC counter in a magneto-optic disk apparatus of the present invention.

FIG. 2 is a flow chart showing the processing of a method of recording data on a recording medium in an apparatus for recording data on the recording medium shown in FIG. 1.

FIG. 3 shows an example of the format of data recorded on the magneto-optic disk as an embodiment of the method of recording data on the recording medium of the present invention.

The meaning of the symbols in FIG. 3 and the applications of the parts indicated are explained below.

SB: Synchronization signal SYNCH byte (Sync Byte)
Application: Used for synchronization
RS: Resynchronization signal RESYNC (Resync Byte)
Application: Used for resynchronization when synchronization is lost
D: Recording data byte
C: CRC byte
P: Defect management (DM) pointer byte
E: Error correction code (ECC) byte In FIG. 3, the top portion shows the data portion and the bottom the error correction data portion.

The configuration of the data portion will be explained next.

At the head of the data, there are the 3 bytes of the synchronization signal SYNC bytes SB1 to SB3. After them come the 20 bytes of data D1 to D2. After these, a single resynchronization signal RESYNC byte RS is inserted and after this 20 bytes of data follow. One resynchronization signal RESYNC byte RS is inserted for each 20 bytes of data.

The configuration of the error correction data portion will be explained next.

The operation of the magneto-optic disk shown in FIG. 1 will be summarized below.

The interface circuit 1 is a data interface circuit between the magneto-optic disk apparatus and the outside. The data to be recorded on the magneto-optic disk 10 is input from here.

The error correction code encoder 2 computes the error correction code shown in FIG. 3 for the data input to the interface circuit i and adds this error correction data to the input data for output.

The data delay circuit 5 is for compensating for the delay time of data processing in the channel encoder 3 and DSV counter 4. Specifically, it delays the data by the amount of the time of one resynchronization signal RESYNC.

The synchronization signal and resynchronization signal generator 6 adds the synchronization signal SYNC and resynchronization signal RESYNC to the output signal of the delay circuit 5 based on the output of the DSV counter 4 and a timing signal from the system controller 11.

The channel encoder 7 performs 1-7 modulation and NRZI modulation on the recording data and error correction data comprised of the output of the synchronization signal and resynchronization signal generator 6 from which the synchronization signal SYNC and resynchronization signal RESYNC have been removed. Further, the modulation is performed for each period portion of data of one RESYNC period, that is, from a SYNC to the next RESYNC or from one RESYNC to the next RESYNC or from one RESYNC to the next SYNC.

In this embodiment, the synchronization signal SYNC and resynchronization signal RESYNC are added to the output signal of the delay circuit 5 by the synchronization signal and resynchronization signal generator 6 for output, but it is also possible to add the synchronization signal and a resynchronization signal having one value to the signal input to the synchronization signal and resynchronization signal generator 6 and change the value of the resynchronization signal in accordance with need.

The write data amplifier 8 amplifies the output data of the channel encoder 7 and supplies the result to the laser diode 9.

The laser diode 9 is driven based on the output data of the write data amplifier 8 and records the recording data on the magneto-optic disk 10 by the optical modulation method.

The channel encoder 3 has a similar function to the channel encoder 7 and performs 1-7 modulation and NRZI modulation on the recording data and error correction data supplied from the error correction code encoder 2. Further, this modulation is performed for each piece of data during one RESYNC period. Here, the channel encoder 3 is provided since it is necessary to find the DSV for the same data as the output of the channel encoder 7.

The DS counter 4 computes the DC components of the output data of the channel encoder 3, that is, the DSV, for each one RESYNC period. The DSV is calculated by making the value +1 when the value of the recording data is 1 and making it −1 when the value of the data is 0. The DSV counter 4, further, has the function of holding the first DSV (DSV1) which was computed in the previous resynchronization signal RESYNC period, comparing this first DSV1 with a second DSV (DSV2) computed in the current RESYNC period, and supplying a resynchronization signal (RESYNC) selection signal in accordance with the results of that comparison to the synchronization signal and resynchronization signal generator 6.

Further, the RESYNC selection signal need only indicate if the RESYNC is to be inverted, so need only be 1 bit of data.

The synchronization signal and resynchronization signal generator 6 selects the first resynchronization signal RESYNC having a predetermined DSV or a second resynchronization signal RESYNC comprised of the first resynchronization signal RESYNC with the values inverted based on the RESYNC selection signal and inserts the selected resynchronization signal RESYNC to the output of the data delay circuit 5.

The operations of the above-mentioned error correction code encoder 2, the data delay circuit 5, the synchronization signal and resynchronization signal 6, the channel encoder 7, the write amplifier 8, the channel encoder 3, and the DSV counter 4 are controlled by the system controller 11.

Next, an explanation will be given of the processing in the case where the operation of the above DSV counter 4 is performed by software with reference to the flow chart shown in FIG. 2.

The synchronization signal and resynchronization signal generator 6 first, at step S1, initializes the value of the first DSV1 and the second DSV2 as 0 after the timing of the synchronization signal SYNC.

Next, the routine proceeds to step S2, where the DSV until the next resynchronization signal RESYNC, that is, the DSV from D1 to D20 in FIG. 3, is calculated. The value of this DSV is made the DSV1.

Next, the routine proceeds to step S3, where the DSV until the next resynchronization signal RESYNC, that is, the DSV from D21 to D40, is calculated. The value of this DSV is made the DSV2.

After this, at step S4, it is detected if DSV1 is larger than 0. If larger, the routine proceeds to step S5, while if smaller, to step S10.

At step S5, it is detected if DSV2 is larger than 0. If larger, then the resynchronization signal RESYNC with an inverted polarity is selected at step S6 and the value of DSV1 is replaced by (DSV1−DSV2) at step S7.

Further, when the DSV2 is smaller than 0 at step S5, the resynchronization signal RESYNC without an inverted polarity is selected at step S8 and the value of DSV1 is replaced by (DSV1+DSV2) at step S9.

Further, at step S10, it is detected if DSV2 is larger than 0. If larger, then the resynchronization signal RESYNC without an inverted polarity is selected at step S11 and the value of DSV1 is replaced by (DSV1+DSV2) at step S12.

When the DSV2 is smaller than 0 at step S10, the resynchronization signal RESYNC with an inverted polarity is selected at step S13 and the value of DSV1 is replaced by (DSV1−DSV2) at step S14.

When the processing of steps S7, S9, S12 and S14 is completed, the routine proceeds to step S15, where it is detected if the signal is the final resynchronization signal RESYNC or not. When not the final resynchronization signal RESYNC, the routine returns to step S3, while when it is the final resynchronization signal RESYNC, the processing is ended.

Further, the detection of whether the signal is the final resynchronization signal RESYNC in the processing of step S15 can be easily performed since the number of the resynchronization signals RESYNC included between two consecutive synchronization signals SYNC is known in advance.

The synchronization signal SYNC is inserted for each unit of recording and reproduction of data, that is, sector. It is possible to detect the sector marks included in the data by the system controller 11. Accordingly, the system controller 11 need only control the DSV counter 4 to operate based on the content of the processing shown in the flow chart each time it detects a sector mark.

As described above, the resynchronization signal RESYNC is inverted to result in an inversion of a final bit of the resynchronization signal, so that the data subsequent to the resynchronization data RESYNC is converted to a data that the DSV when the NRZI modulation is carried out is equal, but the sign is different, because, in the NRZI modulation, when the value of the bit preceding to the data to be modulated is inverted, all the value is inverted.

A specific example is shown in FIG. 5. FIG. 5 shows an example of the relationship between the DSC and RESYNC.

The DSV of the recording data from the synchronization signal SYNC byte SB3 to the first RESYNC RS1 is +8 and the DSV of the recording data from the resynchronization signal RESYNC RS1 to the next RESYNC RS2 is +5. That is, the first DSV is larger than 0 and the next DSV is also larger than 0, so the resynchronization signal RESYNC byte pattern RESYNC 2 comprised of the RESYNC 1 inverted is selected. Further, the new DSV2 becomes −5 due to the updating of the DSV2 and the sum of the DSV from the start becomes (+8−5)=+3.

In the same way, the DSV for the recording data between the next resynchronization signal RESYNC byte RS2 and the next resynchronization signal RESYNC byte is −7, the sum of the DSV before that is +3, or greater than 0, and the next DSV is −7, or less than 0, so the resynchronization signal RESYNC byte pattern is left as it was before, the pattern RESYNC 1 is selected, and the value of the DSV from the first becomes −4.

The DSV 2 and the resynchronization signal RESYNC byte pattern change as shown in FIG. 5 after this.

As explained above, the values of the sums of the DSV doe not disperse, but are contained in a certain range about 0. That is, a substantially DC free state can be obtained. As a result, the probability of erroneous detection of data at the time of reproduction is reduced and it is possible to improve the reliability at the time of recording and reproduction of data by suppressing the low frequency band signal even in the case of an NRZI type recording channel code which is not DC free.

Next, an explanation will be made, with reference to FIG. 6, of a data reproduction apparatus for reproducing data recorded on a magneto-optic disk 10 by the data recording apparatus shown in FIG. 1.

Figure 6:
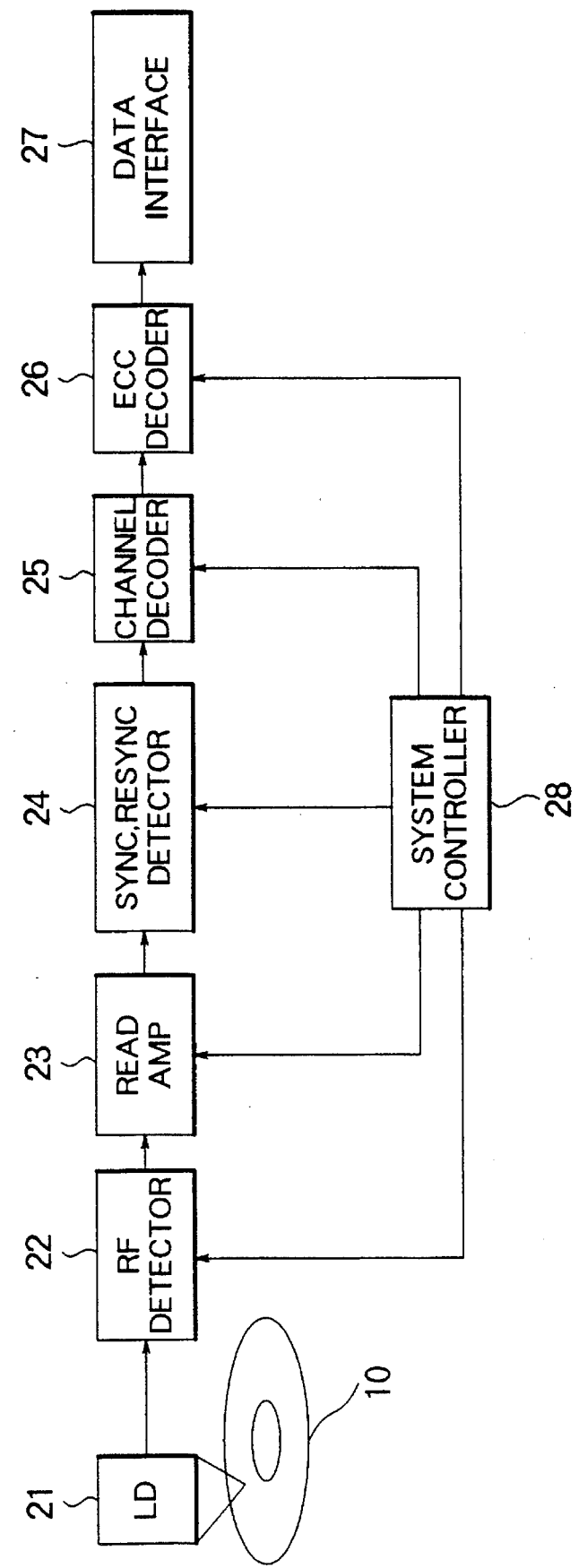
FIG. 6 is a block diagram of a data reproduction system of a magneto-optic disk apparatus of the present invention.

In FIG. 6, 21 is a laser diode for reproducing the data recorded on the magneto-optic disk 10, 22 is an RF detector for detecting RF signals of data reproduced by the laser diode 21, 23 is a read data amplifier for amplifying the RF signal detected by the RF detector 22, 24 is a synchronization signal and resynchronization signal detector for detecting synchronization signals and resynchronization signals from the RF signal amplified by the read data amplifier 23, 25 is a channel decoder for decoding the output of the synchronization signal and resynchronization signal detector 24 on the basis of the synchronization signal and resynchronization signal detected by the synchronization signal and resynchronization signal detector 24, 26 is an ECC decoder for detecting an ECC from the output of the channel decoder 25, 27 is an interface circuit for interfacing between the output of the ECC decoder 26 and outside of the apparatus, and 28 is a system controller for controlling the operation of the RF detector 22, the read decoder amplifier 23, the synchronization signal and resynchronization signal detector 24, the channel decoder 25, and the ECC decoder 26.

Further, the synchronization signal and resynchronization signal detector 24 in FIG. 6 is made able to detect a synchronization signal, a non-inverted resynchronization signal, and an inverted resynchronization signal.

Further, the pattern of the resynchronization signal RESYNC bytes may be a pattern of an inhibition code which enables recovery from loss of synchronization. It is easy in terms of signal processing to use the pattern RESYNC 1 or the inverted pattern RESYNC 2 for the resynchronization signal RESYNC.

FIG. 4 shows an example of the resynchronization signal RESYNC pattern, but the resynchronization signal RESYNC pattern may be any pattern.

The resynchronization signal RESYNC pattern RESYNC 1 and its inverted pattern RESYNC 2 are preferably DC free and inhibit codes, but in this example use is made of comparatively short data of 12 bits to make the inhibit code, so the patterns are not DC free. That is, the DSV of the pattern RESYNC 1 is 2 and the DSV of its inverted pattern RESYNC 2 is −2. However, by lengthening the resynchronization signal RESYNC pattern, it is possible to obtain a DC free resynchronization signal RESYNC pattern.

The changes in the resynchronization signal RESYNC pattern are not limited to the inversion of the pattern RESYNC 1. In principle it is also possible to invert the last bit of the resynchronization signal RESYNC.

Further, the format of the data shown in FIG. 3 was just an illustration. The format is not limited to the above embodiment and may be any format so long as the data is divided into certain constant lengths and a resynchronization signal RESYNC is inserted into the breaks.

Further, the recording medium to which the method of recording data on a recording medium of the present invention can be applied is not limited to a magneto-optic disk and includes optical disks, magnetic disks, magnetic tape, etc. as well.

As explained above, when recording data on a magnetooptic disk etc., by selecting a resynchronization signal RESYNC pattern so as to reduce the DSV as much as possible, it is possible to reduce the probability of erroneous detection of data at the time of reproduction and to improve the reliability of recording and reproduction of data.

While the invention has been described by reference to the specific embodiments chosen for purposes of illustration, it should be apparent that numerous modifications could be made thereto by those skilled in the art without departing from the basic concept and scope of the invention.

What is claimed is:

1. An apparatus for processing digital data comprising:

first modulating means for modulating digital data;

DSV computing means for computing a DSV for every predetermined unit of modulated digital data modulated by said first modulating means;

synchronization signal adding means for selectively adding to each predetermined unit of said digital data a first synchronization signal or a second synchronization signal comprised of said first synchronization signal with at least a final bit inverted in accordance with the results of the computation of said DSV computing means; and second modulating means, connected to said synchronization signal adding means, for performing the same modulation as said first modulating means on said digital data based on said synchronization signal.

2. An apparatus for processing digital data as set forth in claim 1, wherein said first modulating means and second modulating means perform modulation on said digital data by the NRZI system.

3. An apparatus for processing digital data as set forth in claim 1, wherein said synchronization signal adding means adds a signal comprised of said first synchronization signal with all the bits inverted to said first digital data as said second synchronization signal.

4. An apparatus for processing digital data as set forth in claim 1, wherein said synchronization signal adding means adds a signal comprised of said first synchronization signal with just the final bit inverted to said first digital data as said second synchronization signal.

5. An apparatus for processing digital data as set forth in claim 1, wherein said synchronization signal adding means adds a main synchronization signal to each first unit of said digital data and selectively adds said first synchronization signal or said second synchronization signal to said digital data to each second unit of said digital data, smaller than said first unit, in accordance with the results of computation at said DSV computing means.

6. An apparatus for processing digital data as set forth in claim 1, wherein said first and second synchronization signal are inhibit patterns encoded by run length limitation.

7. An apparatus for processing digital data as set forth in claim 1, further comprising recording means for recording on the recording medium the digital data modulated at the second modulating means.

8. A method for processing digital data including the steps of:

(a) performing predetermined modulation to digital data;

(b) computing a DSV for each predetermined unit of the digital data modulated at said step (a), (c) selectively adding to each predetermined unit of said digital data a first synchronization signal or a second synchronization signal comprised of said first synchronization signal with at least a final bit inverted in accordance with the results of the computation at said step (b); and (d) performing the same modulation as in step (a) on said digital data based on said first synchronization signal or said second synchronization signal added at said step (c).

9. A method for processing digital data as set forth in claim 8, wherein at said step (a) and step (b), modulation is performed on said digital data by the NRZI system.

10. A method for processing digital data as set forth in claim 8, wherein at said step (c), a signal comprised of said first synchronization signal with all the bits inverted is added to said digital data as said second synchronization signal.

11. A method for processing digital data as set forth in claim 8, wherein at said step (c), a signal comprised of the first synchronization signal with just the final bit inverted is added to said digital data as said second synchronization signal.

12. A method for processing digital data as set forth in claim 8, wherein at said step (c), a main synchronization signal is added to each first unit of said digital data and said first synchronization signal or said second synchronization signal selectively added to said digital data to each second unit of said digital data, smaller than said first unit, in accordance with the results of computation at said step (b).

13. A method for processing digital data as set forth in claim 8, wherein said first and second synchronization signal are inhibit patterns encoded by run length limitation.

14. A method for processing digital data as set forth in claim 8, wherein further provision is made of a step for recording on the recording medium the digital data modulated at the second modulating means.

* * * * *